United States Patent [19]
Ames

[11] Patent Number: 5,568,578
[45] Date of Patent: Oct. 22, 1996

[54] GRADIENT INDEX ROD COLLIMATION LENS DEVICES FOR ENHANCING OPTICAL FIBER LINE PERFORMANCE WHERE THE BEAM THEREOF CROSSES A GAP IN THE LINE

[75] Inventor: Gregory H. Ames, Gales Ferry, Conn.

[73] Assignee: The United States of America as represented by the Secretary of the Navy, Washington, D.C.

[21] Appl. No.: 359,119

[22] Filed: Dec. 14, 1994

[51] Int. Cl.⁶ .............................. G02B 6/00; G02B 6/36; G02B 6/32; G02B 6/26
[52] U.S. Cl. .................................. 385/34; 385/25; 385/26
[58] Field of Search .................................. 385/25, 26, 34, 385/36; 359/900; 29/833, 868, 869

[56] References Cited

U.S. PATENT DOCUMENTS

| | | | |
|---|---|---|---|
| 3,829,195 | 8/1974 | Rawson | 385/25 |
| 4,109,998 | 8/1978 | Iverson | 385/26 |
| 4,258,976 | 3/1981 | Scott et al. | 385/26 |
| 4,872,737 | 10/1989 | Fukahori et al. | 385/25 |
| 4,943,137 | 7/1990 | Speer | 385/26 |
| 5,157,745 | 10/1992 | Ames | 385/26 |
| 5,271,076 | 12/1993 | Ames | 385/26 |
| 5,371,814 | 12/1994 | Ames et al. | 385/26 |

*Primary Examiner*—Akm E. Ullah
*Attorney, Agent, or Firm*—Michael J. McGowan; Michael F. Oglo; Prithvi C. Lall

[57] ABSTRACT

A novel array of optical fiber beams collimator device, includes as novel components thereof an array of single beam collimator units. A housing is provided with a corresponding array of co-parallel lens bores between opposite sides of the housing. Each unit of the array of single beam collimator units is formed from a gradient index glass, rod-type, collimation lens disposed in the corresponding lens bore with a reinforced terminal end section of an optical fiber attached by its end face to the end face of the lens at one of the sides of the housing. The lenses of the array of units all have a common length dimension of one-quarter pitch plus a predetermined increment of length chosen for coupling maximum power through respective fiber optic lines. The terminal end sections of optical fiber attached to associated lenses of the array have their respective longitudinal axes in individual predetermined lateral spatial relationship to the central axes of their associated lens to produce couplement with generally collimated beams at the other side of the housing which are coparallel with the aforementioned axes.

9 Claims, 5 Drawing Sheets

GRADIENT INDEX ROD COLLIMATION LENS DEVICES FOR ENHANCING OPTICAL FIBER LINE PERFORMANCE WHERE THE BEAM THEREOF CROSSES A GAP IN THE LINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The instant invention is directed to an improved collimation lens device for use in multiple communication channel array of optical fiber lines having a gap in the array. A component of the device also has utility with a single fiber line having a gap in the line.

2. Description of the Prior Art

The device of the present invention especially satisfies a requirement arising in connection with optical fiber rotary joints for interposition in multiple communication channel arrays of optical fiber lines. Multiple channel rotary joints for multi-mode fibers have been developed but the resultant optical trains exhibit high optical loss and the channels exhibit undesired crosstalk. Additionally, the extreme tolerances associated with single-mode fibers preclude the easy adaptation of rotary joints to handle single-mode fiber. The tight tolerances required by single-mode fibers generally result in excessive loss. Rotary joints for single-mode fiber have been developed, but are limited to a single on-axis fiber.

Illustrative of the prior art is U.S. Pat. No. 4,872,737 to T. Fukanori et al, in which precision beam registry across a gap between an array of in optical fibers is obtained by lenses that perform collimation at each side of the gap which further interposition of reflectors to optically guide the individual collimated channel beams with a shortened beam path distances between collimating lenses. This arrangement tends to be complex expensive, and to require a sizeable transverse dimension of required envelope space for a given array of optical fibers. It is to be appreciated that an important motivation for the use of complex organization of this development is the fast degradation of energy coupling across the gap as a function of gap distance in rotary joints for arrays of fiber optic lines.

Typically in the heretofore known rotary joints for multi-mode fibers, ferrule reinforce terminal end sections of fibers were simply mechanically inserted into lens holders for gradient index glass, rod-type miniature collimation lenses with of fiber simply concentrically aligned with its associated rod-type collimation lens.

As mentioned, satisfactory lensing arrangements for rotary joints for single-mode fiber are, prior to the present invention, non-existent.

SUMMARY OF THE INVENTION

Accordingly, the objectives of the invention include the provision of an improved fiber optic beam collimation lens device having lower loss, crosstalk and reflection of light back into the input fibers than heretofore obtainable with the prior art.

The objectives further include provision of such a device which is capable of utility for single or multiple channel applications, and which is capable of utility for applications employing single-mode or multiple-mode optical fibers.

The objectives still further includes provision of such devices which are of special utility as components of rotary joints, especially where the rotary joint employ components whose structures can be adapted to support the devices in aligned relation to a longitudinal direction and to define a reference transverse plane for use in establishing critical spatial relationships of the components of the present device.

The objectives yet further include provision of such a device which enables generating generally collimated beams effective to couple communication signal intelligence over greater lengths of gap in an array of optical fibers than have been heretofore possible.

In accordance with the foregoing objectives, an array of optical fiber beams collimator device comprises a housing which supports an co-parallel array of gradient index glass, rod type collimation lenses, each of a length exceeding one-quarter pitch. At the fiber side of the housing are attached corresponding terminal end sections of optical fibers of the array. Attachment is by an optically transparent adhesive at one side of the housing. The predetermined increment of length by which each rod type collimation lens exceeds one-quarter path is chosen to maximize the beam power coupled through the total optical train for the beam. The housing as adapted to forms structure that defines a reference plane which is transverse to the co-parallel rod-type collimation lenses. The longitudinal axis of each terminal end section is disposed in predetermined lateral spatial relationships relative to the central axis of the corresponding rod-type collimation lens. This predetermined relationship is chosen to couple a beam from the optical fiber with a generally collimated beam at the end face at the other side of the housing which is normal to the transverse reference plane defined by structure of the housing. Because of the above stated geometrical relationships each generally collimated beams at the other side of the housing is also co-parallel with the central axis of the lens. Note that the increment of length in excess of one-quarter pitch is the same the for all lenses of the array, but each lateral spatial relationship between a longitudinal axis of terminal end of a fiber and the central axis of its associated rod-type collimation lens is individually determined for that fiber end section and lens. The invention has another aspect of each rod-type collimation lens and its attached terminal end section, dimensioned and configured as above described, constituting a single beam collimation unit. In a variation of the invention, each rod-type collimation lens is one-quarter pitch in length and the face of the terminal end is spaced therefrom by a modicum of distance into which optically transparent epoxy is flowed and allowed to harden.

BRIEF DESCRIPTION OF THE DRAWINGS

Other objects, features, and advantages of the present invention will become apparent as the invention becomes better understood by referring to the following detailed description of the illustrative embodiments thereof, and to the drawings, wherein.

DETAILED DESCRIPTION OF THE PREFERRED EMBODIMENTS

Figure 1:
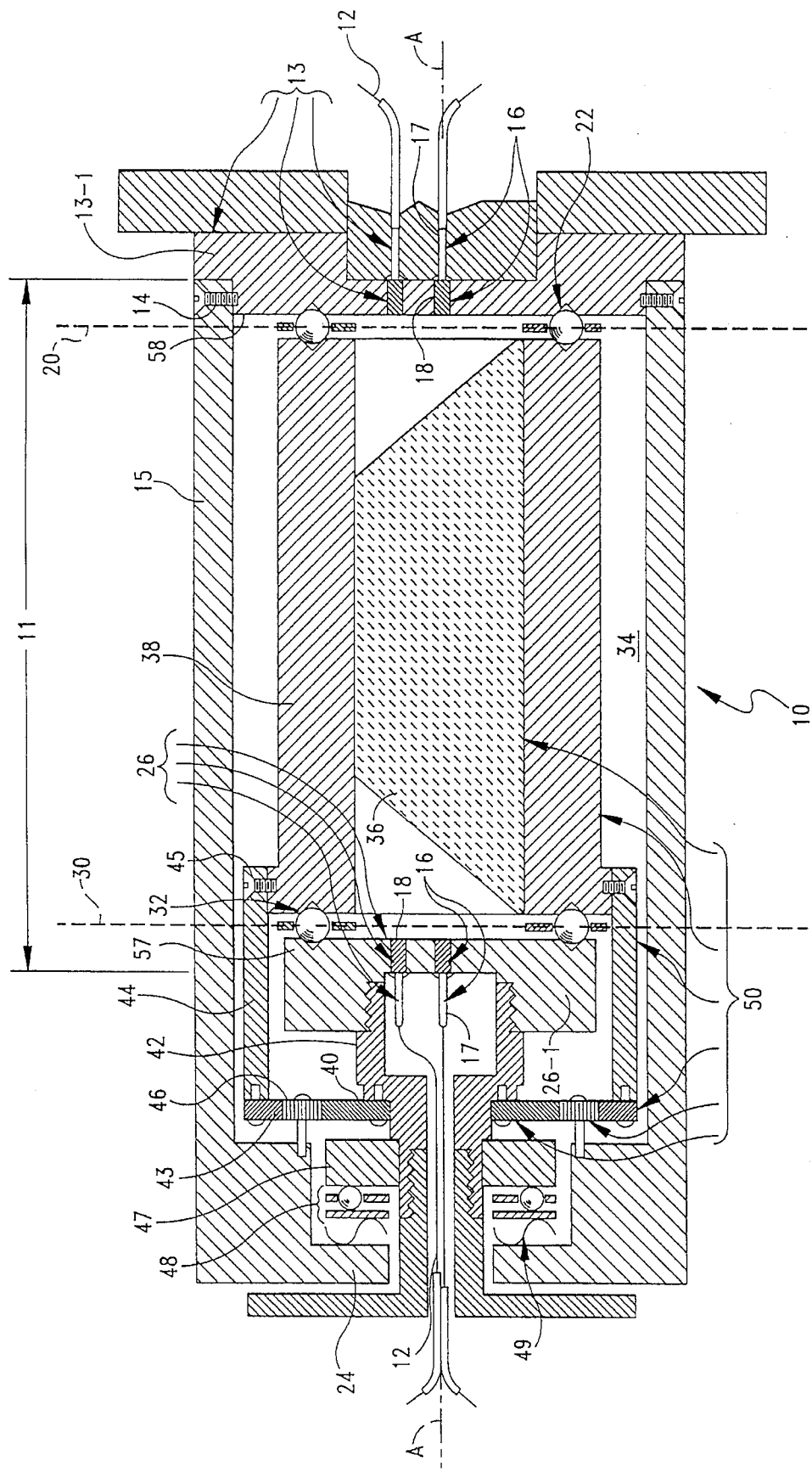
FIG. 1 is a longitudinal sectional view of optical fibers rotary joint assembly including two component novel array of beams collimation lens devices in accordance with the present invention, and in turn each beams collimation device includes two component single beam collimation units in accordance with the invention.

Referring to FIG. 1, a derotation prism type of rotary joint assembly 10 serves to couple an array (multiplicity) of communication channel optical fibers between the two sides of the joint, which rotate relative to one another. The need for presence of the elongated prism in the assembly causes a gap 11 between the spans of the arrays of optical fibers to one and the other sides of the assembly.

There is situated on the right-hand side of gap 11 (i.e., the right-hand side in the view of FIG. 1) an array of beams collimator subassembly 13 which is fastened, as by flat head machine screws 14, to one end of a cylindrical stator member 15. The function of array collimation subassembly 13 is to support and provide an optical alignment spatial reference for a corresponding array of two or more single beam collimator lens units 16, FIGS. 1 and 2. Unit 16 comprises a reinforced terminal end section 17 of optical fiber 12, and a gradient index glass, rod-type miniature collimation lens 18. Terminal end section 17 is reinforced by means of a ferrule 19 which encases the fiber to form a rigid linear structure. Ferrule 19 may be made of glass, ceramic or other equivalent material. Subassembly 13 contains one collimator unit 16 for each fiber optical communication channel coupled by rotary joint assembly 10. The rod-type lens 10 is of special length in accordance with the invention, and reinforced terminal end sections 17 bears is disposed in special spatial relationship to the lens in accordance with the invention. The details of these aspects of the invention will be described below.

Array of beams collimator assembly 13 is integrated into the mechanical structure of rotary joint 10 in a manner permitting continuous 360° rotation about the axis of rotation A of assembly 10 relative to gap 11. This permitted rotation is diagrammatically represented as a transverses generally planar, rotary interface, dashed line 20. Optical beams (not shown) consisting of optical fiber signal beams transformed into generally collimated beams along beam paths normal, or perpendicular, to transverse rotary interface 20. (The nuance underlying the foregoing terminology of "generally collimated beam" vice calling it a straight forward collimated beam of classical optics will be amplified upon below).

Transverse rotary interface 20 is implemented by a rollerballs disposed in a confronting V-groove circular race type of thrust bearing assembly 22, which implements the aforesaid continuous 360° rotation capability relative to structures across interface 20, with very low frictional resistance. It is to be appreciated that other constructions which would implement a transverse rotary interface with tight dimensional tolerances, but very low frictional resistance to relative rotation could be substituted for that described above without departing from the scope of the instant invention.

A flange 24 is formed at the far left-hand end of the cylindrical stator 16. Mounted to the axially inward side of flange 24 for continuous 360° rotation about axis A is another array of beams collimator subassembly 26. Subassembly 26 provides the same functions as are provided by subassembly 13, namely support and provision of a spatial reference for a corresponding array of single beam collimator units 16, but with these units 16 oriented in bilaterally symmetry to those of subassembly 13 at the right-hand side of gap 11. Also at the left-hand side of gap 11, there is provided another transverse rotary interface, dashed line 30, implemented by a like roller balls in a confronting V-groove circular race thrust bearing assembly 32.

In the innerspace 34 between the array of beams collimator assemblies 13 and 26, a derotation prism 36 is carried by a prism rotor 38 that is mounted for continuous 360° rotation by means of roller-ball and V-groove assemblies 22 and 32. The prism 36 is preferably a Dove type. However, other suitable image derotating prisms such as a Pechaun prism may be employed as well.

A star gear 40 is mounted for rotation with array of beams collimation subassembly 26 via an annular member 42, which is affixed to subassembly 26 by threads. An internal ring gear 43 is mounted for rotation with the prism rotor 38 via an annular sleeve 44, which is attached to prism rotor 38 as by flat head machine screws 45. A plurality of planetary gears 46, which are rotatably supported by shafts extending from the flange portion 24 of stator 16, are mounted between and in mechanically ganged relation to both the star gear 40 and internal ring gear 43. A flange 47 is fixedly mounted to annular member 42. As above stated, annular member 42 is in turn mounted in fixed relation to subassembly 26, so that flange 47, annular member 42 and subassembly 26 rotate in unison. A roller-ball type thrust bearing 48 is provided adjacent to the axially outward face of flange 47, and a spring 49 is disposed between the thrust bearing and the axially inward face of flange portion 24, so that all three roller-ball thrust bearing assemblies (22, 32, and 44) along axis of rotation are maintained under resilient compressive stress. The arrangement of star internal ring and planetary gears 40, 43, and 46 provide differential rate of rotation as between subassembly 26 relative to prism rotor 30, of preferably 2:1. The rotation of prism 36 at one half the rate of rotation of subassemblies 13 and 26 derotates beams between array of beams collimation subassemblies 13 and 16. This derotation mechanism is per se old, as disclosed in the hereinabove referenced commonly assigned U.S. Pat. No. 4,109,998 to M. L. Iverson, entitled "Optical Sliprings". While planetary gearing is employed in this embodiment, other mechanical arrangements could alternatively be used to mount and drive prism rotor 38 at a differential rate of rotation without departing from the inventive concept.

In summary, image derotation prism 36, prism rotor 38, star gear 40 internal ring gear 43, annular sleeve 44 and planetary gears 48 constitute an image-derotation-prism-and-prism-rotational-drive-subassembly 50 to decorate optical propagation paths across transverse rotary interfaces 20 and 30, when there is relative rotation between the array of fibers collimation assemblies 13 and 26.

Figure 2:
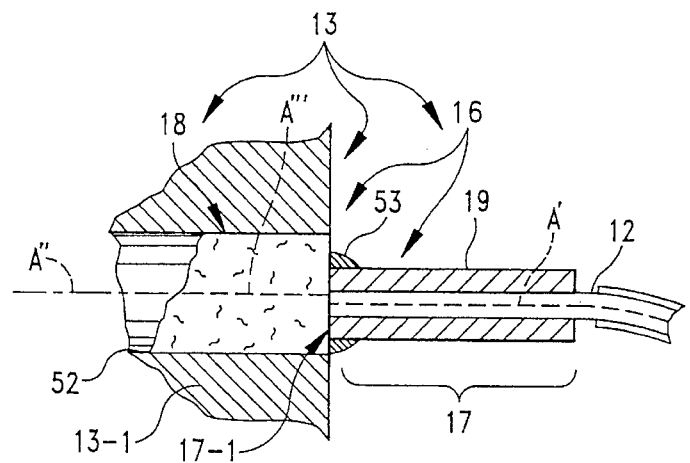
FIG. 2 is an enlargement of a novel single beam collimation unit component of the collimator lens devices of FIG. 1, with a lateral spatial relationship between certain component elements in accordance with the present invention exaggerated.

Referring to FIG. 2, each reinforced terminal end section 17 is fabricated by a conventional technique of affixing by epoxy cement ferrule 19 around the end section of optical fiber 12 (stripped of its protective sheath), and polishing the end surface 17-1 of terminal end section 17 as a precision aligned planar face perpendicular to the longitudinal axis A' of end section 17. This results in terminal end section 17 presenting a unitary surface 17-1 formed of both the optical fiber 12 and its encasing ferrule 19 for purposes of forming the joint between end section 17 and the end face of rod-type collimation lens 18.

The array of beams collimator subassemblies 13 and 26, including their component single beam collimator units 16, are constructed to provide co-parallel alignment between rotation axis A of rotary joint assembly 10 and the linear axes of elements involve with the optical trains present in assembly 10. For example, as is best seen in FIG. 2, there associated with each unit 16 of subassembly 13 is a lens bore 52 through the body element 13-1 of the subassembly. The axes A" of all lens bores 52 are parallel aligned, with tight tolerances to the rotation axis A of assembly 10. Thus both the central axis of the bore A" and the central axis A'" of rod-type lens 18 disposed therein are also parallel aligned, with tight tolerances, to axis A of the rotary joint. As noted, terminal end section 17 was formed with the plane of its end face 17-1 in perpendicular spatial relation its longitudinal axis A'. As assembled in within unit 16, end face 17-1 is butted against the transverse end face of lens 18 and attached by application to the joint therebetween of a suitable optically transparent adhesive medium 53 (shown in exaggeration), such as optically transparent epoxy cement. The end face of lens 18 is polished to form, with tight spatial alignment tolerances, a transverse planar surface. Therefore longitudinal axis A' of terminal end section 17 is also parallel aligned with tight tolerances to rotation axis A of rotary joint assembly 10.

Figure 3A:
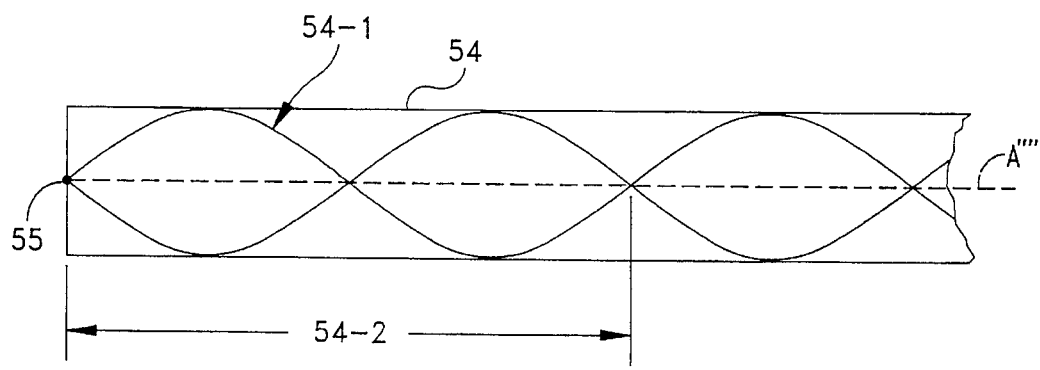
FIG. 3A and 3B are diagrammatic views depicting concepts related to "optical path length characteristics" of glass gradient index rod materials, from which the collimation lens element of each single beam collimation unit of FIG. 2 is made.
Figure 3B:
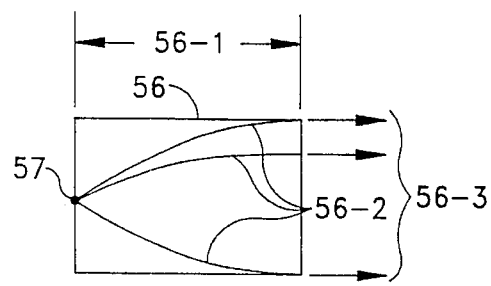

By way of a background discussion before proceeding further in describing the invention, the concept of "optical pitch length characteristic" of the gradient index glass rod material of which lenses 18 are made will be explained with reference to FIGS. 3A and 3B. The refractive index in a rod 54, FIG. 3A, of this material varies in a radial direction from the central axis A'" of the rod. When a source of light 55 of a given wavelength characteristic is applied to one of the end faces of the rod, the radial refractive index gradient therein causes the paths 54-1 of optical beams from source 55 to bend following roughly as a sinusoidal pattern around axis A'"', completing one cycle of a sinusoid in a length 54-2. Length 54-2 is referred to as the "characteristic optical pitch length" of this material for light of this given wavelength characteristic. (The periodicity of beam paths will vary with the wavelength of light used). In FIG. 3B there is depicted a shorter length of the same glass rod material which has be sized to one-quarter of the length 54-2, FIG. 3A, of one cycle, namely the length 56-1, FIG. 3B. Such a lens is specified as "one-quarter pitch". A one-quarter pitch lens is used as a collimation lens, because when a source of divergent light 57 is applied to one of its faces, the optical beam paths 56-2 therein bend to exit the lens at the opposite face as beams paths 56-3 parallel to the central-axis of the lens, thus forming a collimated beam. The converse beam paths are produced when a collimated beam is applied to one of its faces. These converse beam paths will converge at a focal point at the center of the face of the lens opposite to the one where the collimated beam is applied.

Referring again to FIGS. 1 and 2, in accordance with the present invention rod-type collimation lenses 18 are sized to exceed a quarter pitch for the wavelength of the laser light beam in the communication system in which rotary joint assembly 10 is intended to be used, by a predetermined increment. The length of the increment by which the size of lenses 18 exceeds one-quarter pitch is chosen to couple maximum optical power through the entire optical train of the fiber line in which the single beam collimation unit 16 is interposed. State another way, if the converse direction of beam through lens is considered (i.e., a collimated beam impinging the axially inward face of lens 18) then the lens would be sized so that the focal point of the collimated beam would lie within the body of the lens and the face to which terminal end section 17 of the optical fiber 12 is attached would be disposed axially outwardly from the focal point by this predetermined increment of length. This concept of choosing the predetermined increment of length for maximization of transmission of beam power will be better appreciated in light of the description below of one way of making this choice.

Referring again to FIG. 2, in accordance with the present invention in the construction of each beam collimator unit 16 the longitudinal axis A' of terminal end section 17 is positioned in a predetermined lateral spatial relationship with respect to the central axis A'" of the associated rod-type, collimation lens 18. (The lateral displacement shown in FIG. 2 is very highly exaggerated.)

More particularly, a key aspect of the invention is that the longitudinal axis A' of terminal end section 17 is positioned in a predetermined lateral spatial relationship with respect to the central axis A'" of the rod-type lens 18, chosen to provide optical alignment and beam registry between the beam in optical fiber 12 and a "generally collimated" beam at the axial inward face of the associated lens 18, which generally collimated beam is normal to a transverse plane defined by the roller-ball and V-groove thrust bearing assembly 20. The distinction between what is meant by the "generally collimated" vis-a-vis being normally collimated, will become appreciated in connection with a discussion, below, of certain theory of spacing confront units 16 for maximizing coupling of beam power. Note that the transverse position of thrust bearing assembly 20 is in turn basically structurally defined by the axially inward face 58 of the body element 13-1 of array of beams collimator assembly 13. It is to be appreciated that axially inward face 58, the V-groove therein and the confronting V-groove arrangement in prism rotor 38 are all formed with tight tolerance of alignment geometry of the respective surfaces of revolution involved, relative to rotation axis A of rotary joint assembly 10. Since it is also true that the central axis A'" of lens 18 is parallel, with tight tolerances to axis A, it is also true to state that such relationship of axis A' to axis A'" is chosen to provide optical train alignment and beam registry with a collimated beam which propagates in a direction of the parallel to central axis A'" of lens 18. This choice of lateral spatial alignment is made individually in the course of each fabrication of each unit 16. This concept of choosing the lateral spatial relationship to provide optical train alignment and beam registry will be better appreciated in light of an illustration of one way of making this choice, be described below.

While in the present embodiment the tight tolerances of the surfaces of revolution about axis A of the walls of the confronting V-groove of assembly 22 that define a transverse reference plane for use in establishing the predetermined lateral spatial relationship of axis A' to axis A''', other forms of structure associated with these subassemblies 13 and 26 could be employed for this purpose without departing from the invention.

As is known by those skilled in the art of miniature collimation lenses for optical fiber applications, the optical beam diameter of the generally collimated beam emerging from a rod-type, collimation lens 18 is larger than the optical beam diameter within optical fiber 12 applied to the other end of the lens. Accordingly, it will be appreciated that the "beam registry" in this preceding discussion is not "registry" of the beams in the strictest meaning of that term. The practical indicia of beam registry in the context of this invention is power loss due to presence of unit 16. The lower the power loss, the closer the beams are to a relationship of registry.

It is to be appreciated that facilitating the coupling of the optical beams across gap 11 in a way in which substantially maximizes the power coupling capability of an the optical train including an optical fiber communication channel line, and which reduces insertion losses of elements interposes in the optical train, contributes significantly to achieving communication of the signal intelligence carried by the beam with low loss and low crosstalk interference. This in turn permits the arraying of a large number of communication channels passing through assembly 10. Using collimation devices in accordance with the present invention, the number of communication channels which the array of beams collimation subassemblies 13, 26 may accommodate is essentially limited only by acceptable dimensional magnitudes of the volume envelope available for these assemblies and for and image-derotation-prism-and-rotational-drive-subassembly 50.

Optical fiber 12 may be of any of the multi-mode step index, multi-mode, graded-index, single-mode, or polarization preserving types. A commercially available product line of gradient index, rod-type, collimation lenses found satisfactory for use as lenses 18 are the SELFOC lenses supplied by Nippon Sheet Glass Company, which has a business office in Somerset, N.J. ("SELFOC" is a Trademark of the Nippon Sheet Glass Company).

Figure 4:
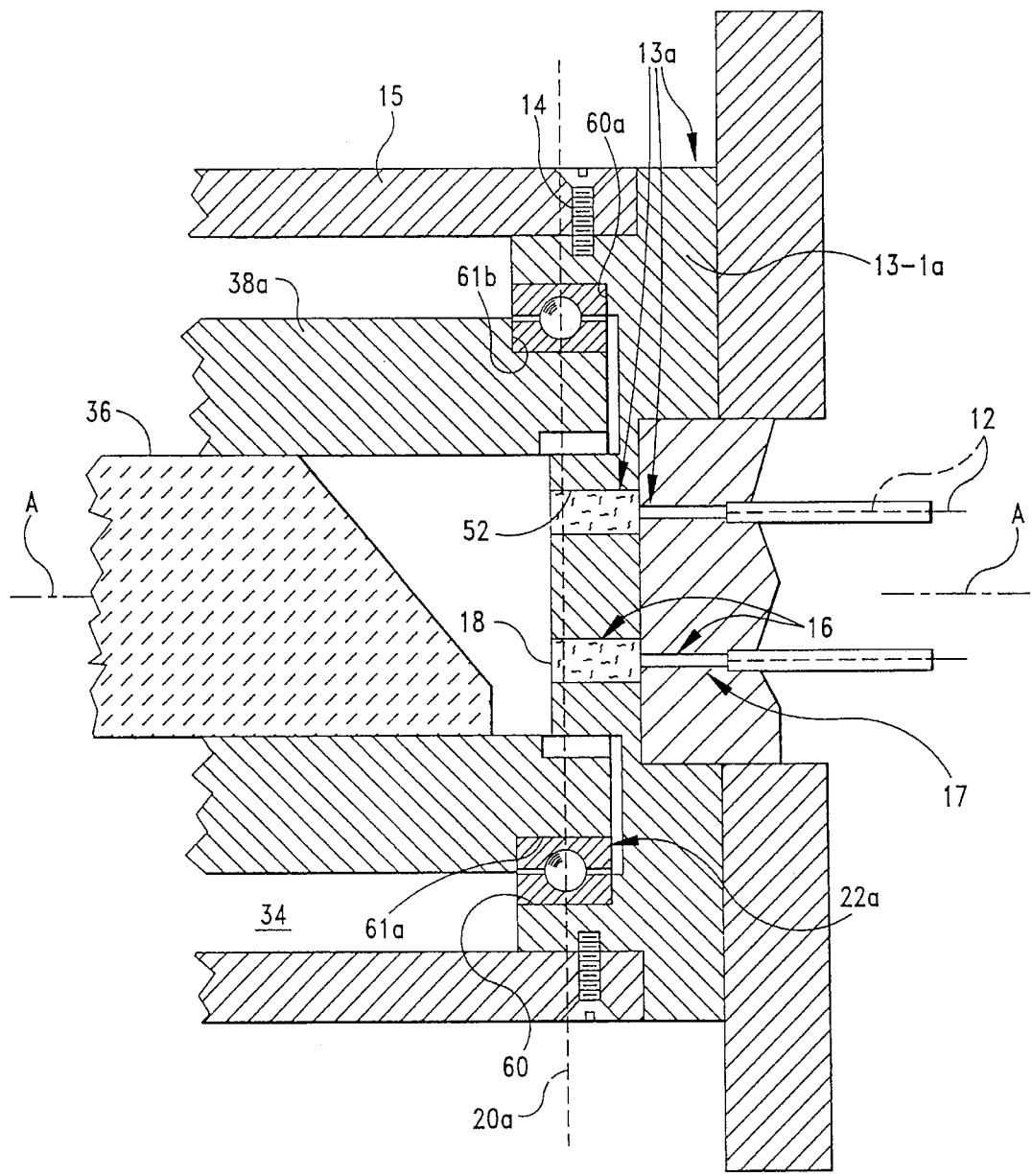
FIG. 4 is a longitudinal section of an alternate form of a novel array of beams collimation device, which constitutes best mode of carrying out the invention.

Reference is now made to FIG. 4, for the embodiment constituting the best mode of carrying out the invention. Items in FIG. 4 which have identical counterparts in FIG. 1 are designated by the same reference character as in FIG. 1. Items which are functional counterparts to corresponding items in FIG. 1, but have some differences of form and structure are designated by the same root reference character as in FIG. 1, but with an appended suffix letter "a". FIG. 4 shows only one array of beams collimation subassembly 13a and a portion of prism rotor 38a at the right hand side of rotary joint assembly 10, it being understood that like form and structure would be present in the array of beams collimation subassembly and the portion of the prism rotor at the other side of gap 11. The basic distinction between subassembly 13a and prism rotor 38a of FIG. 4 relative to the counterpart items in FIG. 1 is the use of a commercially available roller-ball thrust bearing assembly 22a, which is a premium product having particularly tight dimensional tolerances, in place of confronting V-groove assembly 20, FIG. 1. As shown in the drawing, bearing assembly 22a is of the type comprising dual rings with roller-balls caged therebetween. Body member 13-1a of subassembly has formed thereon an axially extending cylindrical bore 60 terminating at axially extending shoulder 60a, both of which are formed as surfaces of revolution with tight dimensional tolerances about rotation axis A of rotary joint assembly 10. The outer ring of bearing assembly 22a is force fitted within bore 60 with its annular end face butted again shoulder 60a. Similarly, a recessed section of cylindrical surface 61a and a shoulder 61b are formed as surfaces of revolution with tight dimensional tolerances on the end portion of prism rotor 38a. The inner ring of bearing assembly 22 is fitted in light engagement therewith.

As will become apparent in a description below (relative to FIG. 6) of one way for determining the lateral spatial relationship of the longitudinal axis A' of a terminal end section 17 to the central axis A''' of its associated rod-type collimation lens 18, the annular face of the inner ring of bearing assembly 22a is suitable for use as structure of subassembly 13a to define a reference plane transverse to rotation axis A of the rotary joint assembly 10.

The aforesaid determination choices of (i) the increment of length by which the length of rod-type collimation lens 18 should exceed one-quarter pitch, and (ii) the lateral spatial relationship of the longitudinal axis A' of terminal end section 17 of optical fiber 12 to the central axis A''' of the rod-type collimation lens are determined in that order. That is to say the length of collimation lens 18 should be determined first and the lateral spatial relationship of axis A' of terminal end section 17 should be determined thereafter.

One illustrative process for determining the increment of length by which collimation lens 18 exceeds one-quarter pitch essentially consists of calibrating such increment by a "cut and try" process applied to samples from a commonly manufactured batch of oversized rod-type lenses, and then polishing the end faces of all the lens in the batch to the calibrated length. A pair of the deliberately oversize lenses of the batch are employed as batch calibration samples. The pair of lenses are polished to matching equal lengths, measured by a micrometer. The first length tried is deliberately one expected to presents too large an increment over one-quarter pitch to provide maximum beam power coupling. Terminal end sections 17 are then attached to the sample lenses with optically transparent epoxy cement, with terminal the end section 17 of the fiber approximately concentrically centered with respect to lens 18. In effect, this provides a matched pair of calibration single beam collimation units 16. The pair of calibration samples of unit 16 are then mounted in an optical bench in a relation of bilateral symmetry to one another (mirror image relationship), separated by a distance corresponding to the optical length of the propagation path between transverse rotary interfaces 20, 30 (i.e., through derotation prism 36) to simulate the optical train of rotary joint assembly 10. If the total optical train of the application in which rotary joint 10 will be used has any other optical elements adding significant optical impedance, these other elements are included in the calibration setup. Stated another way, the total optical train which includes the communication channel optical fiber line which will pass through rotary joint assembly 10, is simulated. Using the capabilities of a conventional optical bench holdfast permitting adjustable alignment, the angular alignment between the individual samples is fine tuned to achieve maximum coupling between the fibers. The optical loss at maximum coupling is recorded. The fibers are then removed from the lenses and the lenses cleaned with a solvent to remove the epoxy. The lenses are polished to a new shorter length and the process is repeated. Through a succession of like steps a plot of optical loss versus lens length is obtained, for each batch of lenses. This plot is then interpreted to determine the re-sized length of the lenses of the batch which results in minimum optical loss when a fiber end portion is abutted against the lens face. I will be appreciated that employing this procedure to construct all the single channel units 16 for an a rotary joint assembly 10 is premised upon all of the communication channel optical fiber lines coupled by rotary joint assembly 10 having common optical train impedance characteristics.

Insofar as the invention is presently understood, it is believed that the following the theoretical discussion is os help in understanding the aspect of the invention of using a rod-type collimation lens whose length exceed one-quarter pitch. It can be shown using Gaussian beam optics formalisms that when using expanded beam coupling, where two optical fibers are coupled by use of two miniature-collimation lenses in a bilaterally symmetrical arrangement, the maximum degree of coupling is not achieved when the fiber faces are located at the lens focal points. (On the other hand, optimum imaging of the first fiber face onto the second face would dictate that the fiber faces should be located at the focal point, and thus would provide a strictly collimated beam between the lenses.) Since, the objective of a laser-light signal fiber optic communication channel is to couple a maximum amount of optical power and not to maintain an optimum image, location of the fiber faces at the focal points is not the answer. Using the same Gaussian beam optics formalisms, the longitudinal positions of the fibers relative to the lenses which provide optimal coupling are instead positions slightly spaced axially outwardly beyond the focal points. Such analysis shows that amount of additional distance needed for maximum power coupling is dependent upon the separation between the two lenses. The further the space between transverse rotary interfaces 20 and 30, the further the end faces of the fibers are required to be beyond the focal points of the lenses.

It will be appreciated that in an arrangement to provide maximum coupling, the resultant beam will not strictly be a collimated beam. However, it will be a nearly, or "generally", a collimated beam. In this specification and the appended claims, the term "generally collimated beam" is used with intentions that it refer to foregoing situation of it not being the strictly collimated from beam predicted by Gaussian beam optics formalisms which focuses images at focal points, but instead being a nearly collimated beam where the beam is coupled between bilaterally symmetrically disposed collimation lenses at points spaced slightly axially outward beyond the focal points of the collimation lenses.

Figure 5:
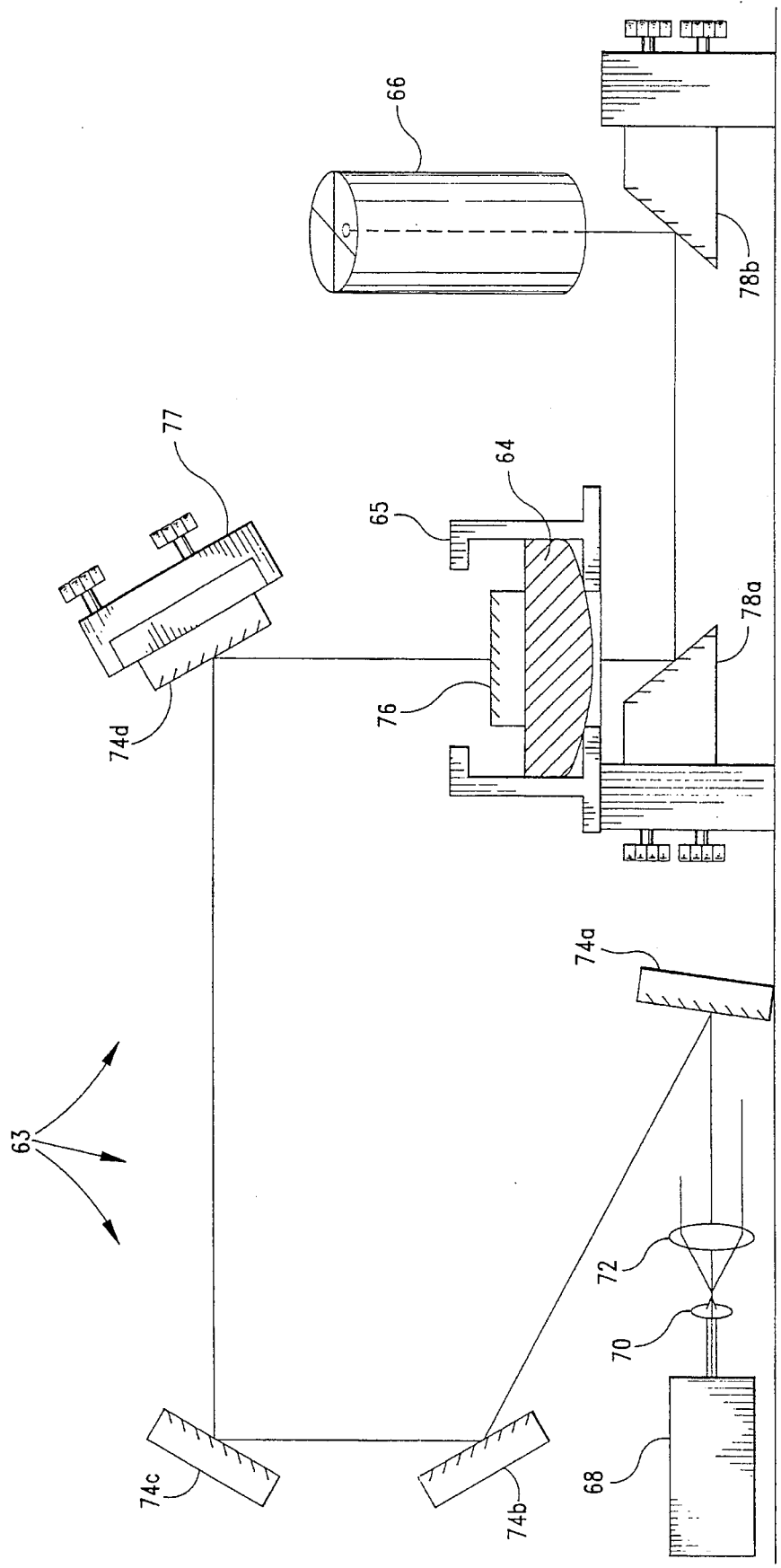
FIG. 5 is a diagrammatic view of an optical bench setup employed during a boresighting calibration phase antecedent to performing the procedure of determining a spatial relationship between elements of the single beam collimation unit of FIG. 2.
Figure 6:
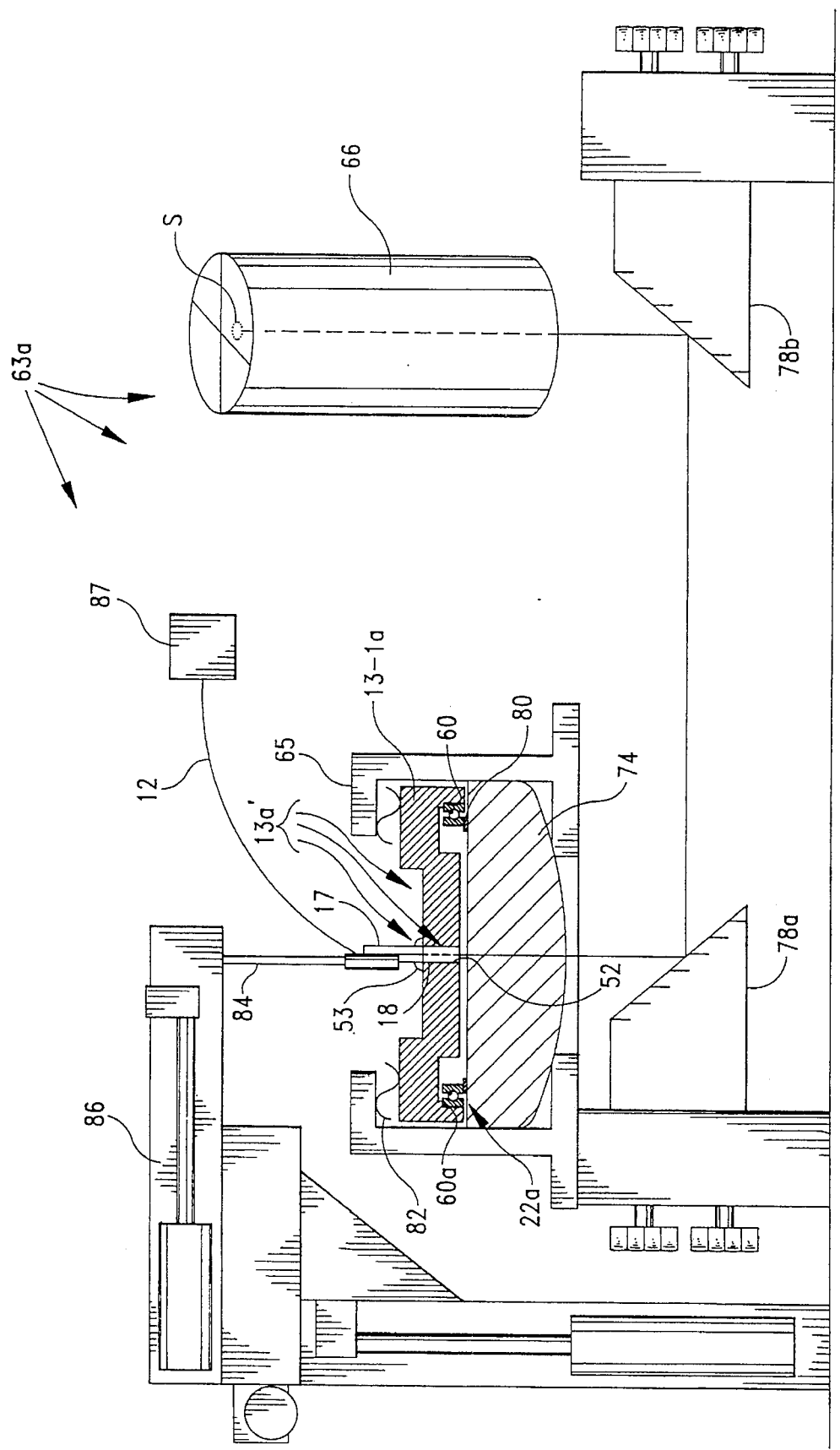
FIG. 6 is a diagrammatic view, of an optical bench setup for determining spatial relationships of elements of the single beam collimation of FIG. 2.

Reference is now made to FIGS. 5 and 6 for one illustrative technique for making the determination of the lateral spatial relationship of the longitudinal axis A of a given terminal end section 17 with respect to the central axis A''' of it s associated rod-type, collimation lens 18. More particularly, FIG. 5 depicts a necessary, antecedent calibration process which is performed upon an optical bench setup 63 in establishing a base-line reference optical train (i.e., bore-sighting the optical train of optical bench setup 63). FIG. 6 illustrates the optical bench setup used in the technique of joining a terminal end section 17 with its associated rod-type, collimation lens while the latter is fixedly disposed in an aperture 52 of an array of beams collimation subassembly 13*a*, FIG. 4.

Referring again to FIG. 5, it is necessary to bore-sight bench setup 63 so that a collimated light beam which is precisely perpendicular to the planar surface of the plano-convex lens 64 held by a fixture 65 will form a substantially focused spot on the center of cross-hairs on an infrared and visible light sensitive display screen 66 which is located substantially at the focal point at the convex side of lens 64.

A beam from a visible light laser 68 is expanded to a larger diameter beam by a train of two lens 70 and 72. This expansion is done to reduce the divergence angle of the beam. The beam is directed over a considerable distance by a train of mirrors 74*a*, 74*b*, 74*c*, and 74*d*, and then to impinge upon a partial mirror 76. Mirrors 74*a*, etc., are optional and function solely to fold the long optical path into a reasonable size room. Partial mirror 76 is manufactured with precise parallelism between its two faces. Thus as it rests on plano-convex lens 64, the upper surface of partial mirror 76 is precisely parallel to the planar surface of plano-convex lens 64. The laser beam is reflected from partial mirror 76. A two-axis mirror mount 77 is used to tilt mirror 74*d* to cause the laser beam to strike the partial mirror 76 precisely perpendicular to its upper mirrored surface. When the laser beam and the surface of partial mirror 76 are precisely perpendicular, the laser beam is retro-reflected so that it traces the same path back to the laser 68. The coincidence of the outgoing and reflected beams in the vicinity of lenses 70 and 72 is the evidence that perpendicularity of beam and partial mirror surface 76 has been achieved. Usually the normal environmental dust on lenses 70 and 72 causes sufficient scattering of light to enable the position where the beams strike the lenses to be seen with the unaided eye. Otherwise a card with a hole in it may be used near lens 72 to pass the outgoing beam and view the reflected beam. Mirror mount 77 is adjusted until the spot due to the reflected beam overlaps the spot from the outgoing beam.

Once the laser beam is perpendicular to the surface of the partial mirror 76, and hence by virtue of parallelism of the opposite faces of partial mirror 76 is perpendicular to the planar surface of the lens 64, the portion of the beam which passes through the partial mirror is focused by the plano-convex lens upon viewing screen 66. A pair of orthogonally disposed two-axis mirrors 78*a* and 78*b* are tilted so that the focused spot on the screen is centered on cross-hairs or any other suitable target. As will become apparent, the cross-hairs now constitute an optical-train-alignment-and-beam-registry target for use in fabricating units 16. This completes the establishment of a base-line reference optical train through optical bench setup 63 (or more simply stated bore-sights the setup).

Reference is now made to FIG. 6 for one illustration of a way of making the choice of the predetermined lateral spatial relationship of the longitudinal axis A' of each terminal end section 17 to the central axis A''' of the rod-type collimation lens 18 to which it is to be joined. FIG. 6 depicts a portion 63*a* of the previous optical bench setup (63, FIG. 5) which is employed in making this choice. The formerly shown partial mirror (76, FIG. 5) which rested in the plano-convex lens 64 during the calibration practice is replaced by array of beams collimation subassembly 13*a*' (i.e., of the type of embodiment identified as the best mode of invention in FIG. 4). However, to facilitate clarity of the description, array piece 13*a*' in FIG. 6 is depicted in a simplified form having only a single lens receiving aperture 52 (it being understood that in the embodiment of rotary joint assembly 10 for coupling a multiple optical fiber line array, the array of beams collimation subassembly is provided with a corresponding set of lens bores 52). The inner ring of roller-ball thrust bearing assembly 22*a* rests on a small annular spacer 80 which in turn rests on the plano-convex lens 74. Annular spacer 80 is formed with tight dimensional tolerances, especially in its thickness direction. A spring 82 provides a resilient force. Note that the resilient force of spring 82 acts upon subassembly 13*a*' in a direction corresponding to the axial direction of force exerted by the spring 51, FIG. 1 to subassembly 13, FIG. 1 of assembly 10. The spring 82 (i) seats ball bearing assembly 22a against spacer 80, and (ii) in turn seats spacer 80 against the planar surface of lens 74 with the same resilient compressive stress as the parts will experience when assembled into the rotary joint assembly 10, FIG. 1. The terminal end section 17 of fiber 12 is held in a holder 84 attached to the three-axis stage 86. Stage 86 is used to move terminal end section 17 until its polished face is in butting engagement with the face of rod-type collimation-lens 18, and concurrently optically transparent epoxy cement is suitably applied in liquid from to be present as a film between the end face (17-1, FIG. 2) of terminal end section 17 and lens 18. The setup is now ready for the start of the lateral alignment. A modicum of slack is provided in the butting engagement between lens 18, to accommodate subsequent lateral positioning of the fiber termination. The epoxy cement in liquid form between the terminal end section 17 and lens 18 acts as a lubricant during subsequent lateral movement. A laser 87 that emits at or near the design wavelength of the beam of the communication channels with which rotary joint assembly 10 is intended to be used, is coupled into fiber 12. (The array of optical fibers with which assembly 10 is intended to be used is sometimes herein, and in the appended claims, referred to as the "utilization array" or "utilization fibers"). From fiber 12 the beam is coupled to lens 54, from which it is emitted as a generally collimated beam. This beam is focussed by the plano-convex lens to a spot S at viewing screen 66. The three-axis stage 86 is then used to align in two axes which are transverse to central axis A''' (FIG. 2) of rod-type collimation lens 18. This transverse movement of terminal end section 17 changes the angle at which the beam exits lens 54, and in turn changes the location of the spot S on screen 66. The end face of terminal end section 17 is swept, in two dimensions, along the surface of the face of lens 18 (aided by the lubricating effect of the epoxy cement which is still in liquid state) until spot S is in registry with, or centered in, the cross-hairs (or optical train alignment and beams registry target) on the screen 66. At that stage in the procedure the beam exiting the miniature lens 18 is precisely perpendicular to the planar surface of the plano-convex lens 74, and hence to the abutting surface of the inner ring of roller-ball thrust bearing assembly 22a. The epoxy cement its allowed to harden.

It will be appreciated that what is being done is the determination of the lateral spatial relationship of the longitudinal axis A' of terminal end section 17 to the central axis A''' of lens 18 that causes the collimated beam emitted from lens 18 to be perpendicular to a reference transverse plane defined by the inner ring of thrust bearing assembly 22a. Accordingly, this inner ring of assembly 22a, (or the axial bore surface 60 and shoulder surface 60a which determines the position of assembly 22a) constitute structure of array of beams collimation assembly 13a' that define such reference plane. It will also be appreciated that inasmuch as axis of rotation A of assembly 10, longitudinal axis A' of terminal end section 17, central, axis A'' of the lens bore 52, and central axis A''' of the collimation lens are co-parallel, then transverse reference plane is co-normal to all such axes. Accordingly, this process may alternatively be considered as determining the lateral spatial relationship of axis A' to axis A''' which provides a collimation beam parallel axis'. It will be appreciated that by adjusting two axes of three-axis stage 86, the longitudinal axis A' of terminal end section 17 of the fiber is located at a position defined by coordinates of a two-dimensional reference set of coordinates whose origin is at the location of the central axis A''' of rod-type, collimation lens 18, in any plane transverse to these axes. It will be further appreciated that this position of longitudinal axis A' causes beams within fibers 12 and generally collimated beams across gap 11 to be in optical train alignment and beam registry one to another.

The above disclosed embodiments of the invention are of a structure in which the terminal end sections 17, FIG. 2 are in abutting engagement against the lens face of the rod-type, collimation lens 18 to which joined, with the length of lens 18 such that the preselected longitudinal position of end face 17-1 for optimum coupling of power is at the lens face. However, it is to be understood that the principles of the invention also apply where the preselected longitudinal position is axially outwardly beyond the face of lens 18 and the end face 17-1 of terminal end section 17 is spaced by a modicum of distance from the face of lens 54. It has been found that the distance between a focal point of a one-quarter pitch, rod-type collimation lens and such preselected position axially outwardly therebeyond is sufficiently small to enable joining a terminal end section 17 to the face of the lens 18 by properly spacing end face 17-1 from the face of the lens and flowing optically transparent epoxy cement therebetween, and allowing same to harden.

The above described illustration of how to determine the increment by which the length of rod-type, collimation lens 18 is to exceed one-quarter pitch, employs a "cut and try" process using a pair of calibration samples. However it is to be understood that an alternate to this is an optical bench process employing back reflection with a beam splitter tapping into the beam where it includes the back reflected component. The split off portion of the beam is directed to a photodetecting power measurement device. The bench would be set up to simulate the bilaterally symmetrical arrangement of a pair single beam collimation units 16 by an optical distance equal to the optical length corresponding to gap 11. The terminal end sections 17 of the pair of units would be mounted on one and the other of a pair of axially adjustable lens holding stations. The critical distance of separation of their bilaterally symmetrical positions which provides optimum beam coupling is empirically determined by bilaterally symmetrically sweeping the axial positions of the pair of lens stations to find positions at which the photodetecting device indicates the split off beam power is maximum. Further, this process could be automated in part or in whole.

In the above description of utility of array of beams collimation subassemblies 13', 26 and their component single beam collimation units 16, has involved a rotary joint where the gap 11 corresponds presence of the derotation prism structure. However, it is to be appreciated that such subassemblies and units also have utility in coupling across gaps that do not involve rotary motion. One example of such a use would be fiber optic connection between an underwater vehicle and a free-floating pod, as disclosed in commonly assigned U.S. Pat. No. 5,291,194 to G. H. Ames. The fiber optic connections there may consist of hermetically sealed windows in a conical recess of the vehicle and such a window in the conical male portion of the pod. When the pod is latched in position, the windows would be in registry. Array of beams collimation assemblies 13, 26 and their component single beam collimation units 16 in accordance with the present invention, could be used to couple the fiber optic communication beams across the gap of the windows.

Many other modifications of the presently disclosed invention will become apparent to those skilled in the art without departing from the scope of the instant invention.

What is claimed is:

1. A fiber optic beam collimator for interposition in a utilization optical fiber line having a gap, said collimator serving to provide intercoupling between a beam propagating within the optical fiber line and the one-in-the-same beam propagating in the gap in the form of a generally collimated beam, said collimator comprising:

a span of said optical fiber line ending at one side of said gap and adapted to form a reinforced terminal end section;

a gradient index glass, rod-type collimation lens having a length which exceeds one-quarter pitch by a predetermined increment, said predetermined increment being chosen to substantially maximize transmission of beam power through the utilization optical fiber line in which the collimator is interposed; and said reinforced terminal end section being disposed with its longitudinal axis parallel aligned with the central axis of the rod-type, collimation lens with the end of the optical fiber in an abutting relationship to a first of the opposite end faces of the rod-type, collimation lens, and further being disposed with its longitudinal axis in a predetermined lateral spatial relationship to said central axis of the lens, which relationship is chosen to provide optical train alignment and beam registry between the beam in the optical fiber and the one-in-the-same-beam in generally collimated form at the second side of the rod-type collimation lens propagating in a direction parallel to said central axis of the lens.

2. A fiber optic beam collimator in accordance with claim 1, said said utilization optical fiber line, which is involved in the choice of said predetermined increment, includes a another fiber optic beam collimator installed in the optical fiber line at the other side of the gap in bilaterally symmetrically orientated relation to the instant fiber optic beam collimator.

3. A fiber optic beam collimator in accordance with claim 2, said lateral spatial relationship of said longitudinal axis to said central axis of the rod-type, collimation lens being such that the location of the intersection of the longitudinal axis with a first transverse reference plane, containing a two-dimensional reference coordinate system whose origin is at the intersection of said central axis with said first reference plane, is a two-coordinate position.

4. A fiber optic beam collimator in accordance with claim 3 further comprising:

a lens support and spatial reference housing means having a lens bore extending therethrough and providing structure for defining a transverse reference plane;

said rod-type, collimation lens being disposed in said bore; and said predetermined lateral spatial relationship of said longitudinal axis of the reinforced terminal end section to the central axis of the lens being chosen to cause a beam passing from the optical fiber to the lens to emerge from the second end face of the lens as a generally collimated beam normal to said reference plane.

5. A fiber optic beam collimator in accordance with claim 1 wherein:

said reinforced terminal end section of the optical fiber including an encasing ferrule, the optical fiber and the ferrule being so constructed and arranged to form a unitary planar end surface suitable for abutting engagement against collimation lens; and said unitary planar end surface is joined to the first end face of said rod-type, collimation lens by an optically transparent adhesive medium.

6. A fiber optic beam collimator in accordance with claim 1, wherein said optical fiber is of the single-mode type.

7. A fiber optic beam collimator in accordance with claim 1, wherein said optical fiber is of the multiple-mode type.

8. A fiber optic array of beams collimator for interposition in a utilization array of at least two optical fibers where there is a gap in said array, said collimator serving to provide intercoupling between the beams propagating within the optical fibers and the same beams propagating in the gap in the form of generally collimated beams, said beams collimator comprising:

a span of said array ending at said gap and including at least two optical fibers;

a lens housing means having a corresponding array of cylindrical bores extending therethrough between an optical fiber side thereof and a generally collimated beam side thereof, the central axes of all the bores being in parallel alignment with a collimator longitudinal axis, said housing means providing structure for defining a first transverse reference plane;

a corresponding array of gradient index glass, rod-type, collimation lenses disposed in said array of bores, and all of the lenses of the array in common being of a length which exceeds one-quarter pitch by a predetermined increment chosen to substantially maximize transmission of beam power through an optical fiber of the utilization array; and each optical fiber of the array end forming a reinforced terminal end section which is disposed with its longitudinal axis parallel aligned with the collimator longitudinal axis and disposed with the end of the optical fiber in substantially an abutting relationship to the end face of the corresponding rod-type, collimation lens at the optical fiber side of the housing means, said longitudinal axis of the reinforced end section further being disposed in a predetermined lateral spatial relationship to the optical axis of said rod-type, collimation lens, said predetermined lateral spatial relationship being chosen to provide optical train alignment and beam registry between the beam in the optical fiber and the one-in-the-same beam in generally collimated form at the end face of the lens at the generally collimated beam side of the housing means propagating in a direction normal to said first transverse reference plane.

9. A fiber optic beam collimator for interposition in a utilization optical fiber line having a gap, said collimator serving to provide intercoupling between a beam propagating in the gap in the form of a generally collimated beam, said collimator comprising:

a span of said optical fiber line ending at one side of said gap and adapted to form a reinforced terminal end section;

a one-quarter pitch gradient index glass, rod-type collimator lens;

said reinforces terminal end section being disposed with its longitudinal axis parallel aligned with the central axis of the rod-type, collimator lens with the end of the optical fiber spaced from a first of opposite faces of the rod-type collimator lens by a predetermined modicum of distance chosen to substantially maximize transmission of beam power through the utilization optical fiber in which the optical beam collimator is interposed;

an optically transparent adhesive medium flowed and allowed to harden in the modicum of distance between the end of the optical fiber and said first face of the rod-type collimator terminal end section would be defined as a two-coordinate position; and said reinforced terminal end section being further disposed with its longitudinal axis in predetermined lateral spatial relationship to said central axis of the lens, which relationship is chosen to provide optical train alignment and beam registry between the beam in the optical fiber and the one-in-the-same beam in generally collimated form at the second side of the rod-type collimation lens propagating in a direction parallel to said central axis of the lens.

* * * * *